United States Patent [19]

Oikari et al.

[11] Patent Number: 5,329,123

[45] Date of Patent: Jul. 12, 1994

[54] METHOD AND A DEVICE FOR PREVENTING OPTICAL CROSSTALK BETWEEN LIQUID SCINTILLATION SAMPLES DEPOSITED ON TRANSCULCENT SAMPLE PLATES

[75] Inventors: Timo Oikari, Turku; Kauko Lehtinen, Raisio; Stefan Järnström, Pargas; Tapio Yrjönen, Turku, all of Finland

[73] Assignee: Wallac Oy, Turku, Finland

[21] Appl. No.: 948,603

[22] Filed: Sep. 23, 1992

[51] Int. Cl.$^5$ .................................................. G01T 1/204
[52] U.S. Cl. ................................. 250/362; 250/364; 250/328
[58] Field of Search ................ 250/364, 328, 368, 362

[56] References Cited

U.S. PATENT DOCUMENTS 5,039,860  8/1991  Yrjönen et al. .............. 250/364 X
5,061,853 10/1991  Lethinen et al. ............. 250/364 X Primary Examiner—Constantine Hannaher
Assistant Examiner—Edward J. Glick
Attorney, Agent, or Firm—Adduci, Mastriani, Schaumberg & Schill

[57] ABSTRACT

An invention for preventing optical crosstalk in a process of counting liquid scintillation samples deposited in a sample plate, the sample plate composed of a plurality of sample wells, the optical crosstalk being caused by mutual optical affection between samples deposited in the sample wells. Sample wells are provided with tubes made of material impermeable but reflective or scattering for scintillation light generated by the samples.

10 Claims, 2 Drawing Sheets

METHOD AND A DEVICE FOR PREVENTING OPTICAL CROSSTALK BETWEEN LIQUID SCINTILLATION SAMPLES DEPOSITED ON TRANSCULCENT SAMPLE PLATES

BACKGROUND OF THE INVENTION

Liquid scintillation counters are commonly used for measuring count rates or activities of radioactive samples containing beta, or corresponding, particle emitting radionuclides, e.g., H-3, C-14, S-35, 1-125, P-32 etc.

Many beta particles are of low energies and have ranges generally less than few tens of micrometers in the sample. As a consequence, the sample to be measured has to be intimately contacted with a scintillation medium, most often by dissolving it into a liquid scintillator which typically comprises an organic solvent and at least one fluorescent solute present in a few percent by weight of the solution. In radiation interaction processes, kinetic energy of the beta particle is absorbed by the solvent and then transferred to the solute which emits a burst of scintillation photons, whose amount is proportional to the energy of the beta particle. These scintillation photons are detected with a detector that usually consists of two, coincidence operating, photomultiplier tubes producing electric pulses. The height of the pulses are proportional to the amount of emitted scintillation photons and thus proportional to the energy of the interacted beta particle. Coincidence operation is employed for eliminating the random thermal noise pulses of photomultiplier tubes.

Normally liquid scintillation counters are provided with one detector and they are designed to measure samples in 7 ml or 20 ml glass or plastic vials.

A novel liquid scintillation counter, designed for counting samples directly from multi-well sample plates is shown in U.S. Pat. No. 5,061,853 (Lehtinen et al.), which apparatus can count liquid scintillation or corresponding samples directly from a sample plate which comprises several separate sample wells or vials. The apparatus has one or several detectors in order to count one or several samples at a time. The sample plate is placed in the counting position on a rigid plate holder made of photon attenuating material and having holes for the wells of the sample plate. The walls of the holes are reflecting or scattering in order to guide the photons from the liquid scintillation sample to the detectors, built of two photomultiplier tubes operating in coincidence and situated on the opposite sides of the holes of the plate holder. The wells of the sample plate can be closed by an adhesive transparent tape. The apparatus can be used also for counting gamma radiation emitting samples if the holes of the sample plate are surrounded by gamma radiation sensitive detectors.

Another novel scintillation counting system for insitu measurement of radioactive samples in a multiple-well plate is presented under European Patent Publication Number 0425767A1 (VanCauter et al.). This apparatus is provided with multiple photomultiplier tubes positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to discriminate between pulses attributable to sample events within the wells and pulses attributable to non-sample events such as photomultiplier tube noise. The discrimination is effected by determining whether a selected number of electrical pulses occurs with a prescribed time interval, the occurrence of the selected number of pulses within the prescribed time interval signifying a sample event. Only the electrical pulses attributable to sample events are supplied to a pulse analyzer.

The multi-well sample plates have typically eight rows of wells, whose diameter is 7-8 mm arranged in twelve columns with 9 millimeters distance between the center points of the wells. The typical volumes of sample wells of such 96-well sample plates are 200-400 microliters depending on the height of the plate. Another type of multi-well sample plate has four rows of wells arranged in six columns. The volume of the wells of such 24-well sample plates exceeds one milliliter. When the wells of the multi-well sample plate are separate, the plate can be placed for counting on a rigid sample plate holder made of photon attenuating material and having thru-holes for the wells of the sample plate as shown in U.S. Pat. No. 5,061,853 (Lehtinen et al.). As a consequence, an optically isolated compartment is formed around each sample well of the sample plate. Unfortunately, most of the commercially available multi-well sample plates are transparent and the wells are joined together with ribs, bridges and the like in order to stiffen the sample plate. Therefore, it is impossible to place them in the above mentioned sample plate holder to isolate them optically. Consequently, some amount of the scintillation photons produced by the absorption of the beta particle in a certain sample well may travel to other sample wells and thus produce an undesired increase in observed count rates in those wells. This phenomenon is called optical crosstalk. It is known that the use of opaque multi-well sample plates can reduce optical crosstalk as mentioned in TopCount Topics PAN0005 6/91, published by Packard Instrument Company, Meriden USA 1991. However, in many applications transparent multi-well sample plates are preferred, and most of the commercially available multi-well sample plates are transparent.

SUMMARY OF THE INVENTION

The present invention shows a novel method for preventing optical crosstalk, when measuring liquid scintillation samples having been deposited in sample plates comprising a plurality of sample wells, which optical crosstalk is caused by optical affection of samples deposited in other sample wells.

According to the invention it is characterized by providing said sample wells with tubes made of material impermeable but reflective or scattering for scintillation light generated by said samples.

DETAILED DESCRIPTION OF THE PREFERRED EMBODIMENTS

Figure 1:
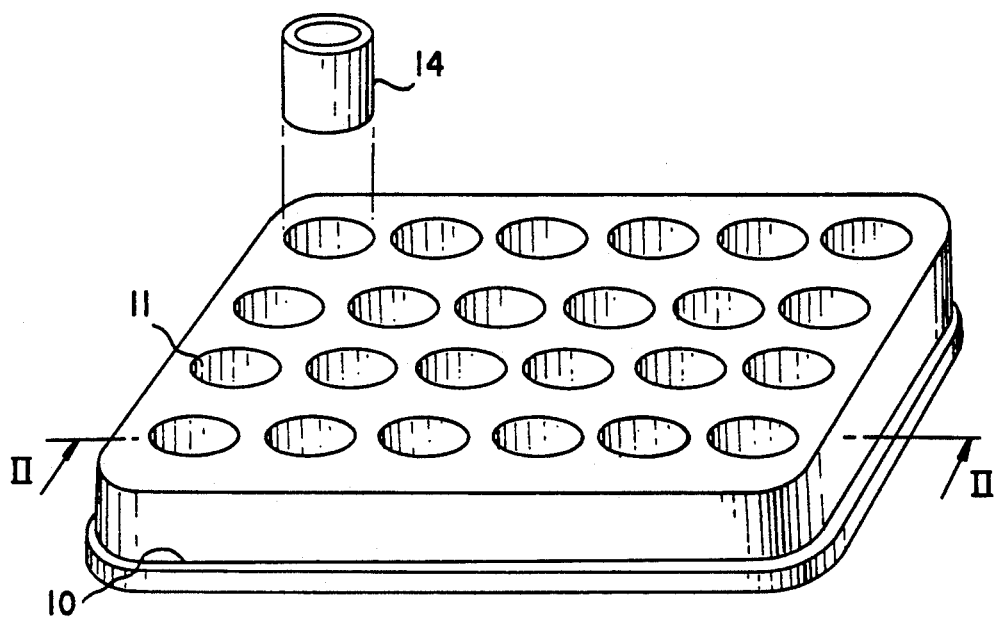
FIG. 1 shows a perspective view of a typical typical multi-well translucent sample plate having 24 sample wells in a 4×6 matrix format.
Figure 2:
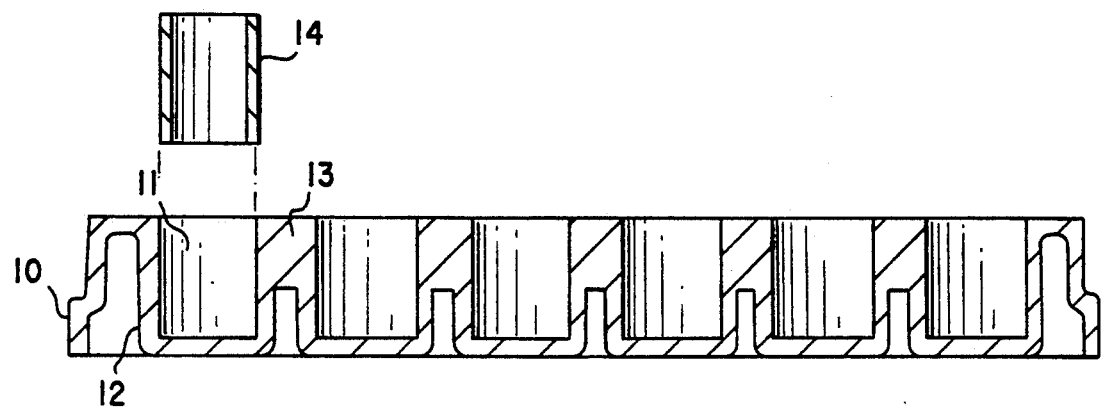
FIG. 2 shows a cross-sectional view of a multi-well sample plate having 24 sample wells in a 4×6 matrix format taking along line II—II in FIG. 1.

FIG. 1 shows a multi-well sample plate 10 having 24 sample wells 11 in a 4×6 matrix format. FIG. 2 shows a cross-sectional view of a multi-well sample II—II in FIG. 1. The walls 12 of said sample wells 11 are made of translucent material and joined together with ribs 13. As a consequence of this it is impossible to isolate the wells 11 optically by placing said sample plate 10 on a rigid plate holder made of photon attenuating material and having holes for the wells of the sample plate. As a further consequence of this some amount of the scintillation photons produced by the absorption of the beta particle in sample well 11 may travel to other sample wells and thus produce an undesired increase in background count rates in those wells. This phenomenon is called optical crosstalk.

In FIGS. 1 and 2 is shown also a tube 14 made of light impermeable but reflective or scattering material. The outer diameter of said tube 14 is equal or slightly smaller than the inner diameter of sample wells 11 and the shape of said tube 14 corresponds to the shapes of said wells 11, for example if wells 11 are slightly conical then the shape of the tube 14 is also conical. The height of said tube 14 is equal to the inner height of said wells.

The tube according to the invention can be constructed in many ways. For instance, it can be made of reflective metal, such as polished aluminium. It can also be made of special-grade scattering polycarbonate plastic, such as Lexan (Trade Mark of General Electric) ML 3042 containing a high amount of white pigment to produce a very high degree of reflectivity to eliminate optical crosstalk between wells.

Ideally the plastic should be non-soluble to the liquid scintillator used. Furthermore, the tube can be made of plastic having a reflective or scattering surface layer processed on the interior surface of the tube.

Figure 3:
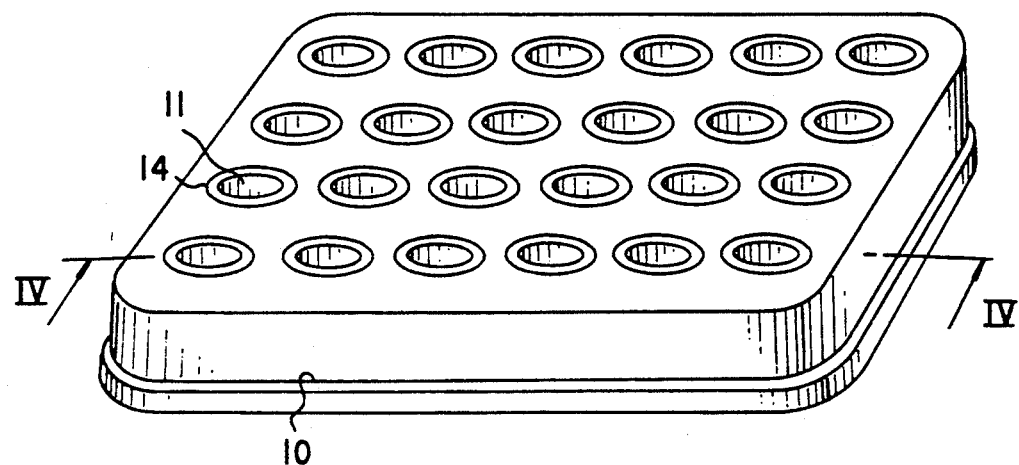
FIG. 3 shows a perspective view of a typical typical multi-well translucent sample plate having 24 sample wells in a 4×6 matrix format, in this plate each well is provided with a light impermeable but reflective tube.
Figure 4:
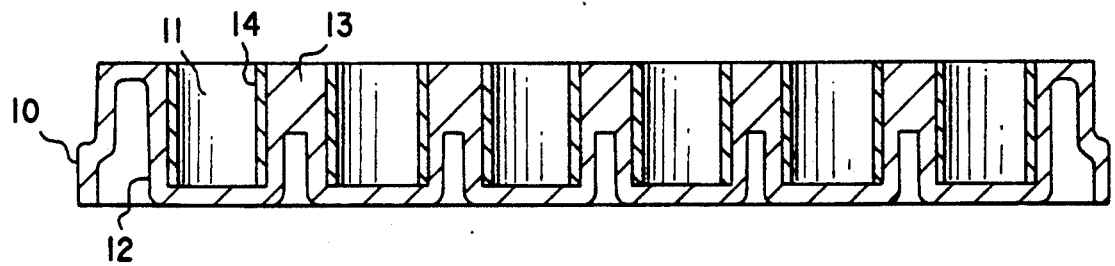
FIG. 4 shows a cross-sectional view of a multi-well sample plate having 24 sample wells in a 4×6 matrix format taking along line IV—IV in FIG. 3.

FIG. 3 and FIG. 4 show the same sample plate 10 as in FIG. 1 and FIG. 2, but now said wells 11 are provided with tubes 14. As a consequence of this said sample wells 11 are optically separated and in addition the inner surfaces 15 of said tubes guides the scintillation photons produced by samples in said sample wells 11 to the cathodes of photomultiplier tubes (not shown) operating in coincidence and situated on the opposite sides of said sample wells 11.

The present invention is not confined to the above descriptions alone, but it may show even considerable variation within the scope of the patent claims.

We claim:

1. A method for counting scintillation samples with a liquid scintillation counter comprising the steps of:
   providing a sample plate having a plurality of sample wells for containing said scintillation samples,
   positioning into each of said sample wells to be investigated a tube having an outer diameter equal to or slightly less than an inner diameter of said sample well, said tube made of material impermeable for scintillation light generated by said scintillation samples, said tube thereby preventing optical crosstalk between adjacent sample wells, and
   counting said samples with said liquid scintillation counter.

2. A method according to claim 1 wherein said material impermeable for scintillation light is a plastic containing a white pigment.

3. A method according to claim 1 wherein said material impermeable for scintillation light is a plastic having a reflecting or scattering interior surface.

4. A method according to claim 2 or 3 wherein said plastic is polycarbonate.

5. A method according to claim 1 wherein said material impermeable for scintillation light is a polished aluminum.

6. An apparatus for preventing optical crosstalk in a process of counting liquid scintillation samples deposited in a sample plate, the apparatus comprising:
   a sample plate having a plurality of sample wells, and
   a plurality of tubes mad of material impermeable for scintillation light generated by said samples, respective ones of said tubes positioned within respective ones of said plurality of sample wells.

7. An apparatus according to claim 6 wherein an inside wall of said tubes is made of a reflective or scattering material for scintillation light generated by said samples.

8. An apparatus according to claim 6, said sample plate further comprising a plurality of ribs for joining together adjacent walls of said plurality of wells.

9. A system according to claim 6, wherein said plurality of tubes are made of a reflective metal.

10. A system according to claim 6, wherein said plurality of tubes are made of polycarbonate.

* * * * *